(12) United States Patent
Verscheure et al.

(10) Patent No.: US 8,840,702 B2
(45) Date of Patent: Sep. 23, 2014

(54) PROCESS FOR THE VALORIZATION OF METALS FROM LI-ION BATTERIES

(75) Inventors: Karel Verscheure, Vichte (BE); Mieke Campforts, Heverlee (BE); Maurits Van Camp, Mortsel (BE)

(73) Assignee: Umicore, Brussels (BE)

( * ) Notice: Subject to any disclaimer, the term of this patent is extended or adjusted under 35 U.S.C. 154(b) by 261 days.

(21) Appl. No.: 13/497,276

(22) PCT Filed: Sep. 24, 2010

(86) PCT No.: PCT/EP2010/005840
§ 371 (c)(1),
(2), (4) Date: Jun. 4, 2012

(87) PCT Pub. No.: WO2011/035915
PCT Pub. Date: Mar. 31, 2011

(65) Prior Publication Data
US 2012/0240729 A1    Sep. 27, 2012

Related U.S. Application Data

(60) Provisional application No. 61/272,529, filed on Oct. 5, 2009.

(30) Foreign Application Priority Data

Sep. 25, 2009 (EP) .................... 09012195

(51) Int. Cl.
| | |
|---|---|
| C22B 5/04 | (2006.01) |
| C22B 7/00 | (2006.01) |
| C22B 23/00 | (2006.01) |
| H01M 10/54 | (2006.01) |
| C22B 23/02 | (2006.01) |
| C22B 26/12 | (2006.01) |

(52) U.S. Cl.
CPC .............. C22B 7/003 (2013.01); C22B 7/001 (2013.01); C22B 23/026 (2013.01); H01M 10/54 (2013.01); C22B 26/12 (2013.01); Y02E 60/12 (2013.01); C22B 23/023 (2013.01); C22B 23/025 (2013.01); C22B 5/04 (2013.01)
USPC .......................................... 75/626

(58) Field of Classification Search
CPC ........ C22B 5/04; C22B 7/003; C22B 23/025; C22B 23/026; C22B 23/023; H01M 10/54; Y02E 60/122
USPC ............................................ 75/626
See application file for complete search history.

(56) References Cited

U.S. PATENT DOCUMENTS

| | | | |
|---|---|---|---|
| 7,169,206 B2 * | 1/2007 | Cheret et al. ................ | 75/10.19 |
| 7,192,564 B2 * | 3/2007 | Cardarelli et al. ............. | 423/62 |
| 2003/0126943 A1 | 7/2003 | Schoukens et al. | |

FOREIGN PATENT DOCUMENTS

| | | |
|---|---|---|
| EP | 1589121 | 10/2005 |
| GB | 1537248 | 12/1978 |
| JP | 3057321 | 6/2000 |
| KR | 100796369 | 1/2008 |
| SU | 1629341 | 2/1991 |
| WO | WO 2005031014 | 4/2005 |

OTHER PUBLICATIONS

"Autogenous." Dictionary.com. Dictionary.com, 2014. Web. May 19, 2014. <http://dictionary.reference.com/browse/autogenous?s=t>.*
International Preliminary Report on Patentability, issued in PCT/EP2010/005840, dated Apr. 5, 2012.
International Search Report, issued in PCT/EP2010/005840, dated Dec. 23, 2010.

* cited by examiner

*Primary Examiner* — George Wyszomierski
*Assistant Examiner* — Tima M McGuthry Banks
(74) *Attorney, Agent, or Firm* — Brinks Gilson & Lione

(57) ABSTRACT

The invention concerns a recycling process for recovery of metals from Li-ion batteries. More particularly, an autogeneous process is disclosed for the recovery of Co from Li-ion batteries also containing Al and C, comprising the steps of: —providing a bath furnace equipped with means for 02 injection; —providing a metallurgical charge comprising CaO as a slag former, and Li-ion batteries; —feeding said metallurgical charge to the furnace while injecting O2, whereby at least part of the Co is reduced and collected in a metallic phase; —separating the slag from the metallic phase by tapping; characterized in that the fraction of Li-ion batteries, expressed as weight % of the metallurgical charge, is at least equal to 153%−3.5 (Al %+0.6 C %), Al % and C % being the weight % of Al and C in the batteries, thereby enabling to operate the smelt reduction process in autogeneous conditions. This process possesses advantages over the state of the art process using a shaft furnace, having a large tolerance towards the morphology of the charge, high energy efficiency, and simplified off-gas cleaning requirements.

4 Claims, No Drawings

PROCESS FOR THE VALORIZATION OF METALS FROM LI-ION BATTERIES

This application is a National Stage application of International Application No. PCT/EP2010/005840, filed Sep. 24, 2010, which claims the benefit of U.S. Provisional Application No. 61/272,529, filed Oct. 5, 2009, the entire contents of which are hereby incorporated herein by reference. This application also claims priority under 35 U.S.C. §119 to European Patent Application No. 09012195.5, filed Sep. 25, 2009, the entire contents of which is hereby incorporated herein by reference.

The disclosed invention concerns a recycling process for recovery of metals from Li-ion batteries.

HEV (hybrid electric vehicles) or EV (electric vehicles) rely on high performance rechargeable batteries. While NiMH batteries (nickel-metal hydrides) have dominated until today, it is generally expected that Li-ion batteries will prevail in the near future. This is especially true for electric vehicles (EV), where a high gravimetric energy density of the embarked batteries is key to success.

It is therefore projected that considerable quantities of Li-ion (H)EV batteries will hit the recycling market in the coming years. These could be both worn-out batteries and manufacturing rejects. Such batteries contain valuable metals, such as Cu, Ni, Mn and Co, which are worthwhile to recycle both from an economic and an ecologic point of view. Ni, Mn and Co are normally present in an oxidized form.

At present, the best available technology for (H)EV battery recycling is the cupola packed-bed technology, where batteries together with fluxes and cokes are molten in a shaft to form a molten slag and Co-bullion. This process, described in EP-A-1589121, ensures a high metals recovery of more than 97% for Co, Ni and Cu. Its main advantage is that undismantled cells can be safely treated: as the heating rate in the shaft is low, the gasses evolving inside the cells can slowly escape, thereby avoiding any explosive release of gasses. Battery explosions are indeed a considerable threat for vehicular batteries, as the individual cells can be much larger than the cells commonly found in portable electronics.

This cupola process has however also a number of drawbacks.

The coke consumption is very high, amounting to 30-40% of the feed. This amount of coke is needed to carry out the reduction, and also to keep the packed bed sufficiently porous. Size segregation in the shaft is furthermore difficult to avoid, which leads to an increased pressure drop over the packed bed. Large quantities of fines are also carried over with the gasses, resulting in problems at the bag house.

The objective of the present invention is to overcome these problems by using a bath smelting process where the feed is directly introduced into a molten bath.

The invented process is particularly adapted for treating metallurgical charges mainly constituted by Li-ion batteries. The invention concerns a process for the recovery of Co, which is present in an oxidized form, from Li-ion batteries also containing Al and C, which is present as graphite or in organic matter, comprising the steps of:

providing a bath furnace equipped with means for $O_2$ injection;

providing a metallurgical charge comprising CaO, and preferably $SiO_2$, as slag formers, and Li-ion batteries;

feeding said metallurgical charge to the furnace while injecting $O_2$, whereby at least part of the Co is reduced and collected in a metallic phase;

separating the slag from the metallic phase by tapping;

characterized in that the fraction of Li-ion batteries, expressed as weight % of the metallurgical charge, is equal to or larger than 153%−3.5 (Al %+0.6 C %), Al % and C % being the weight % of Al and C in the batteries.

This formula implies autogeneous process conditions when smelting a typical mix of Li-ion batteries, when using a normal production furnace. No additional reducing agent or fuel is then needed.

In a preferred embodiment, the fraction of Li-ion batteries, expressed as weight % of the metallurgical charge, is equal to or larger than 181%−4.1 (Al %+0.6 C %), Al % and C % being the weight % of Al and C in the batteries. This formula implies autogeneous process conditions when smelting a typical mix of Li-ion batteries, even when using a furnace with high thermal losses.

In either one or both of the above formulas, the factor (Al %+0.6 C %) will generally be lower than 35%, as Li-ion batteries with higher amounts of Al and/or C are not commonly encountered. The invented process is most suitable to treat such typically available Li-ion batteries.

It is advisable to perform the $O_2$ injection using a submerged oxy-gas burner.

It is moreover useful to make use of a furnace equipped with means to provide freeze lining of the slag.

A bath furnace requires only a basic charge preparation as the morphology of the feed is far less critical than with a shaft furnace. Also, the burden of gas cleaning is considerably lightened as no additional plasma torch is needed for the post combustion of the exhaust gasses with secondary air. When combining this with the known principle of post-combustion of the CO above the bath, the energy efficiency of the process is even further enhanced.

According to the invention, when a sufficient amount of Li batteries is incorporated in a metallurgical charge, the charge becomes autogenous with respect to oxygen as only reactant. The hitherto necessary battery-rich charge is practical to achieve in many cases. No additional coke is necessary to ensure the right porosity of the charge, as is needed for a blast furnace.

The excellent reduction kinetics and yields that are achieved are believed to be due to the proximity of metallic Al and oxidized metallic elements (such as Co, Ni and Mn) within the Li-batteries themselves. This characteristic is preserved, even if the batteries are pre-processed, such as by shredding and lixiviation, as long as the Al and the oxidized metals retain their proximity.

Batteries such as those found in portable devices can be fed as such to the furnace, i.e. without dismantling or shredding. The risk of explosion is then mitigated as the individual cells are sufficiently small. However, directly feeding large (H)EV batteries or battery packs may require additional protection measures in the furnace, in particular the use of freeze lining. Freeze lining is indeed known for protecting the fire-bricks of furnaces against chemical attack. It however also appears suitable to protect against the mechanical attack from exploding batteries.

The reduced Co and Ni, which, together with the Cu that is most of the time also present in such charges, form a metal bullion. This bullion can be further processed according to known ways for the separation and recovery of the metals. Mn is mostly sent to the slag. Li is partially fumed and partially slagged. Li could be recovered from slag or fumes using known processes, especially if the economic value of Li would rise, further to its increased world consumption.

In Li-ion batteries, Al is generally present in its metallic form; C is typically present in the inorganic graphite anode, but also in the organic material in and around the cells. Organic C participates to the reduction and to the enthalpy in a similar way as graphite, allowing the total amount of C to be considered for applying the formula.

When applying the formula defining the minimum fraction of batteries needed to sustain energy-efficient processing, a result of more than 100% is obviously to be considered as unfeasible. Some margin has moreover to be provided to also encompass a reasonable amount (at least 15% by weight) of slag formers in the metallurgical charge. The precise amount depends in known ways mainly upon the slag formers chosen (CaO, possibly also $SiO_2$), and upon the Al content of the batteries.

If the minimum fraction of batteries according to the above formulas cannot be reached, batteries containing more Al and/or more C have to be selected. Supplementing with additional gas and oxygen is another possibility, but this would forgo the principles of economy and ecology of the invention.

The charge may contain, besides the required relative amount of Li-ion batteries, also other components, typically NiMH batteries. Materials containing metallic Al or organics are also compatible, as they would contribute to the autogenous character of the process.

By "oxidized form" is meant not only oxides but also compounds wherein the metal is an electron donor.

By "metallurgical charge comprising a fraction of Li-ion batteries" is meant a charge comprising the said relative amount of batteries, either as such, or after physical processing, such as after dismantling, shredding, and selection by flotation.

"Batteries" may be actual cells, packs of cells, assemblies, or their scrap.

Chemical analyses are expressed as % by weight, based on dry materials.

A more detailed description of the process is now presented.

A batch consisting of unprocessed Li batteries, fluxes and other raw materials containing valuable metals is fed in a bath smelting furnace. The furnace consists of three zones, the gas zone, the slag zone and the alloy zone. Oxygen is injected in the slag zone.

The charge falls under gravity in the molten slag bath, which is at about 1450° C. As a result, the Li batteries are rapidly heated, may detonate, and the residues react rapidly thanks to the good contact between reduction agents (such as the electrolyte, the plastics and the Al), and the oxides (such as $LiCoO_2$) in the batteries. The submerged injection leads to vigorous stirring of the bath, which in turn also leads to fast reaction kinetics.

Only a minor part of the reduction agents is lost by evaporation or pyrolysis, the energy content of the batteries being efficiently employed for the reduction and as heat source.

However, the detonating batteries are susceptible to spall pieces of refractory. Therefore, the furnace wall is cooled in the slag zone to form a freeze lining. A freeze lining consists of solidified process material, in this case mostly slag. This freeze lining is self regenerating. Thus, as a part of the freeze lining is deteriorated by explosions, fresh layers are rapidly grown.

In the gas zone, all CO, H, and volatilized plastics and electrolyte are post-combusted with the secondary air entering through the feed port. As a result, the formation of dioxins is prevented. The off gases are further treated with a classical gas cleaning system.

Al, Si, Ca and some Fe and Mn collect in the slag, while most Co and Ni (more than 90% of the input), and a large part of the Fe (more than 60%) collect in the alloy. Both slag and alloy are tapped, whereupon a new batch is processed.

Typically, the process can treat all types of Li batteries, and, depending on the required Li battery content, also other types of raw materials that contain valuable metals like Co and Ni or their scrap. CaO, and preferably also $SiO_2$, are added to flux the $Al_2O_3$, in order to obtain a liquid slag.

EXAMPLE 1

The Li-ion based charge shown in Table 1 is smelted according to the invention in a small furnace with a diameter of 1.5 m lined with chrome-magnesia bricks, the lining having a thickness of 300 mm.

The weighted mean Al and C content of the Li-ion fraction can be calculated as respectively 9.4 and 32.3% by weight. According to the preferred formula, which is applicable when a relatively small furnace is used or when the furnace has high thermal losses, a minimum of 62.9% of Li-ion material is needed to sustain the autogenous combustion of the charge in this case.

The feed comprises 64.4% by weight of Li-ion material. This being slightly higher than the minimum required, the process indeed appears to be autogenous. A bath temperature of 1450° C. is obtained without additional cokes or gas. $O_2$ is blown through a submerged burner at a rate of 265 Nm3/h. This burner is thus used as a tuyere for $O_2$ only, i.e. without simultaneous injection of any kind of fuel. Fuel, such as $CH_4$, is only used for the preparation of a starting bath of molten slag, and during tapping.

As an essential part of the metallurgical charge, batteries and battery packs weighing up to 50 kg are dropped into the molten bath from a height of 8 m. The furnace is operated in a mode allowing for freeze lining. Freeze lining is established by applying intensive cooling in of the slag zone, using water-cooled copper blocks according to known ways. Essentially no degradation of the furnace wall over time is observed.

Excellent recovery of the metals Co, Ni, Cu and Fe is observed with no added energy requirements.

TABLE 1

| | Feed and products for autogenous process according tot the invention | | | | | | | | | |
|---|---|---|---|---|---|---|---|---|---|---|
| | kg | Co % | Ni % | Cu % | Fe % | Li % | $SiO_2$ % | CaO % | $Al_2O_3$ % | Al % | C % |
| Feed | | | | | | | | | | | |
| Li-ion batteries | 689 | 15.1 | 1.5 | 10 | 2.0 | 2.0 | | 0 | | 7 | 44 |
| Li-ion scrap | 294 | 21.6 | 13.0 | | 4.1 | | | | | 15 | 5.0 |

TABLE 1-continued

Feed and products for autogenous process according tot the invention

|  | kg | Co % | Ni % | Cu % | Fe % | Li % | SiO$_2$ % | CaO % | Al$_2$O$_3$ % | Al % | C % |
|---|---|---|---|---|---|---|---|---|---|---|---|
| NiMH batteries | 149 | 2.5 | 27.0 |  | 25.0 |  |  |  |  |  | 5.5 |
| Sand | 134 |  |  |  |  |  | 100 |  |  |  |  |
| Limestone Product | 260 |  |  |  |  |  | 4.8 | 53.3 |  |  | 11.4 |
| Slag | 567 | 0.9 | 0.1 | 0.2 | 0.4 | 3.9 | 24.6 | 22.7 | 30.0 |  |  |
| Alloy | 372 | 44.2 | 23.7 | 17.6 | 27.8 |  |  |  |  |  | 0.2 |
| Flue dust | 24 | 7.2 | 3.8 | 8.7 | 0 | 15.0 | 0.6 | 13.3 | 18.4 |  |  |
| Yield | % |  |  |  |  |  |  |  |  |  |  |
| Slag | 58.9 | 3 | 1 | 2 | 5 | 86 | 99.9 | 97.6 | 97.5 |  |  |
| Alloy | 38.7 | 96 | 98 | 95 | 95 | 0 | 0 | 0 | 0 |  |  |
| Flue dust | 2.4 | 1 | 1 | 3 | 0 | 14 | 0.1 | 2.4 | 2.5 |  |  |

COMPARATIVE EXAMPLE 2

The Li-ion based charge shown in Table 2 is smelted in a furnace similar to the furnace of Example 1.

The Al and C content of the Li-ion fraction is respectively 15 and 5% by weight. According to the preferred formula, which is applicable when a relatively small furnace is used or when the furnace has high thermal losses, a minimum of 107% of Li-ion material would be needed to sustain the autogenous combustion of the charge in this case. This is obviously infeasible, as the fraction of Li-ion material cannot even approach 100% due to the need for at least some sand and/or limestone to maintain a liquid slag.

The feed comprises 61.0% by weight of Li-ion material, a higher amount being incompatible with the maintenance of a liquid slag. This is way below the minimum requirement for the process to be autogenous. A bath temperature of 1450° C. is obtained, with an addition of 410 Nm3/h of CH$_4$ and 422 Nm3/h of O$_2$ blown through a submerged burner.

Excellent recovery of the metals Co, Ni, Cu and Fe is observed, but the elevated energy requirement (CH$_4$ and O$_2$) renders the process less attractive.

TABLE 2

Feed and products for non-autogenous process (Comparative example)

|  | kg | Co % | Ni % | Cu % | Fe % | Li % | SiO$_2$ % | CaO % | Al$_2$O$_3$ % | Al % | C % |
|---|---|---|---|---|---|---|---|---|---|---|---|
| Feed |  |  |  |  |  |  |  |  |  |  |  |
| Li-ion scrap | 1200 | 21.6 | 13.0 |  |  | 4.1 |  |  |  | 15 | 5.0 |
| Sand | 262 |  |  |  |  |  | 100 |  |  |  |  |
| Limestone Product | 506 |  |  |  |  |  | 4.8 | 53.3 |  |  | 11.4 |
| Slag | 1146 | 0.7 | 0.1 |  |  | 3.7 | 23.7 | 21.8 | 29.0 |  |  |
| Alloy | 418 | 59.6 | 36.6 |  |  |  |  |  |  |  | 0.2 |
| Flue dust | 37 | 7.1 | 4.2 |  |  | 18.7 | 0.7 | 16.7 | 23.1 |  |  |
| Yield | % |  |  |  |  |  |  |  |  |  |  |
| Slag | 71.6 | 3 | 1 | 2 | 5 | 86 | 99.9 | 97.6 | 97.5 |  |  |
| Alloy | 26.1 | 96 | 98 | 95 | 95 | 0 | 0 | 0 | 0 |  |  |
| Flue dust | 2.3 | 1 | 1 | 3 | 0 | 14 | 0.1 | 2.4 | 2.5 |  |  |

The invention claimed is:

1. A process for the recovery of Co from Li-ion batteries also containing Al and C, comprising:

providing a bath furnace equipped with an O$_2$ injection device;

providing a metallurgical charge comprising CaO as a slag former, and Li-ion batteries;

feeding said metallurgical charge to the furnace while injecting O$_2$, whereby at least part of the Co is reduced and collected in a metallic phase; and separating the slag from the metallic phase by tapping;

wherein the process is operated in autogeneous conditions by providing a fraction of Li-ion batteries, expressed as weight % of the metallurgical charge, equal to or larger than 153%-3.5 (Al %+0.6 C %), Al % and C % being the weight % of Al and C in the batteries.

2. The process of claim 1, wherein the fraction of Li-ion batteries, expressed as weight % of the metallurgical charge, is equal to or larger than 181%-4.1 (Al %+0.6 C %), (Al %+0.6 C %) being less than 35%.

3. The process of claim 1, wherein the means for O$_2$ injection device is a submerged oxy-gas burner.

4. The process of claim 1, wherein the furnace is operated so as to provide freeze lining of the slag.

* * * * *

UNITED STATES PATENT AND TRADEMARK OFFICE
CERTIFICATE OF CORRECTION

| | | |
|---|---|---|
| PATENT NO. | : 8,840,702 B2 | Page 1 of 1 |
| APPLICATION NO. | : 13/497276 | |
| DATED | : September 23, 2014 | |
| INVENTOR(S) | : Verscheure et al. | |

It is certified that error appears in the above-identified patent and that said Letters Patent is hereby corrected as shown below:

In the Claims:

Column 6, Claim 3, line 38, please delete "means for".

Signed and Sealed this
Tenth Day of February, 2015

Michelle K. Lee
*Deputy Director of the United States Patent and Trademark Office*